United States Patent [19]

Noggle

[11] Patent Number: 5,095,785

[45] Date of Patent: Mar. 17, 1992

[54] SELF ACTUATING GENERATING TOOL

[75] Inventor: Kenneth G. Noggle, W. Bloomfield, Mich.

[73] Assignee: GTE Valenite Corporation, Troy, Mich.

[21] Appl. No.: 630,906

[22] Filed: Dec. 20, 1990

[51] Int. Cl.⁵ .............................................. B23B 3/26
[52] U.S. Cl. ........................................ 82/1.2; 82/131; 408/158; 409/233
[58] Field of Search ............... 408/153, 158; 82/1.2, 82/131, 1.4; 409/233

[56] References Cited

U.S. PATENT DOCUMENTS 4,852,438  8/1989  Reiterman ............................. 82/131

Primary Examiner—Steven C. Bishop
Attorney, Agent, or Firm—Bill C. Panagos

[57] ABSTRACT

A machine tool that includes a rotary spindle having a radially movable cutter element. An axially movable drawbar within the spindle is used to move the cutter element to its retracted or extended position. A harmonic drive unit is carried on the spindle for imparting rotary movement to a cam element that has a driving connection with the drawbar. The harmonic drive unit can be controlled through a remotely-operated brake that is adapted to be selectively engaged with a reaction member that forms part of the harmonic drive unit.

8 Claims, 1 Drawing Sheet

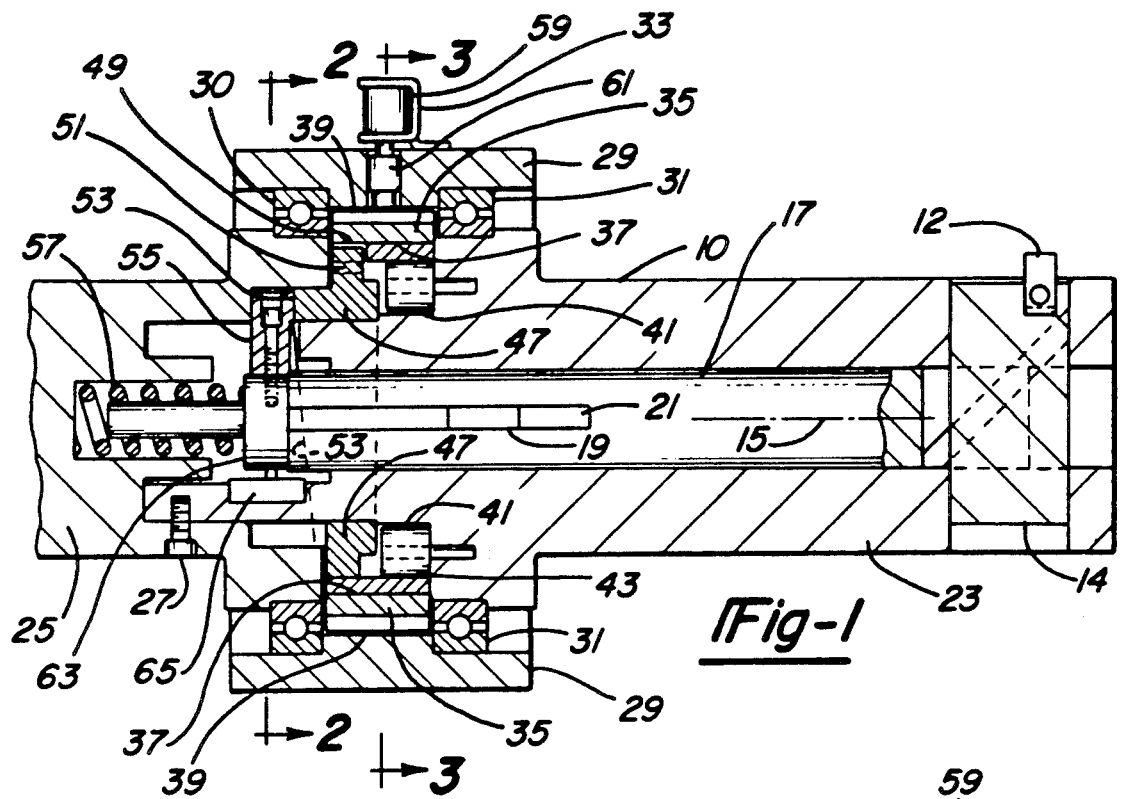
*Fig-1*
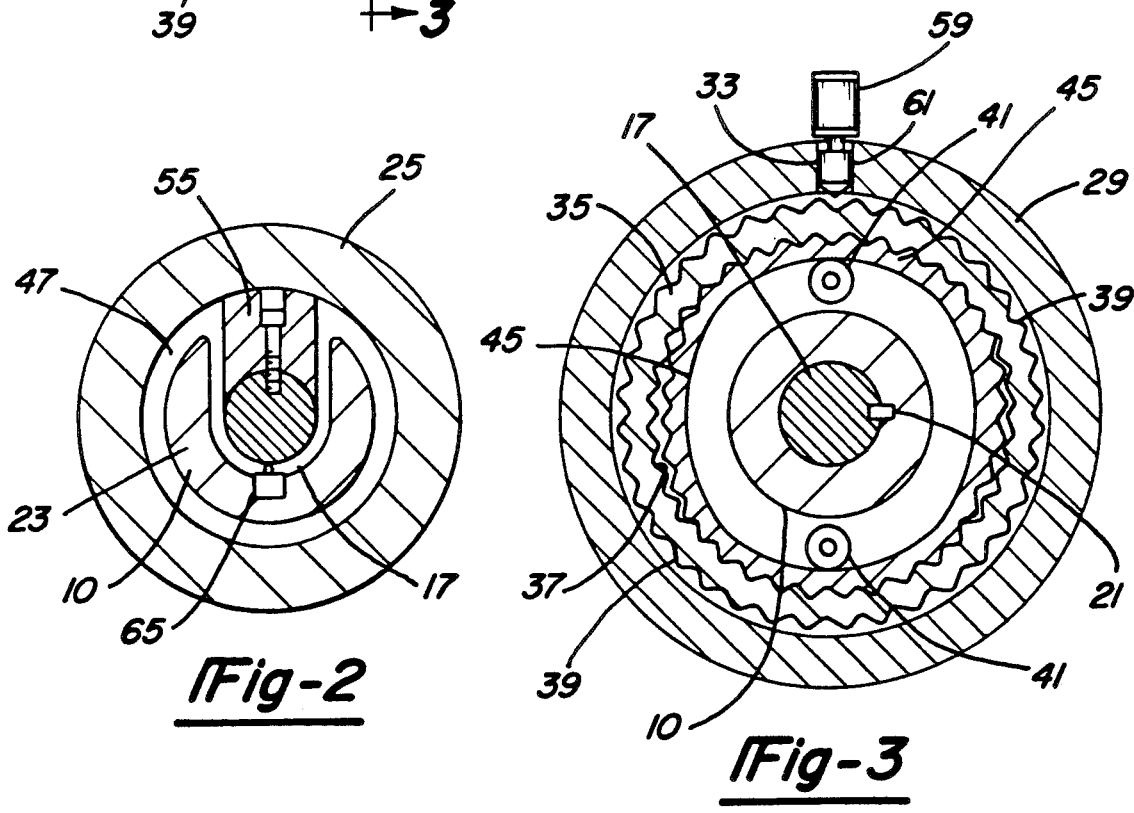
*Fig-2*
*Fig-3*

SELF ACTUATING GENERATING TOOL

BACKGROUND AND SUMMARY OF THE INVENTION

This invention relates to a machine tool that comprises a rotary spindle having a radially movable cutter means on one end thereof. An axially slidable drawbar is arranged within the spindle for moving the cutter means radially into the spindle.

A principal feature of this invention is the mechanism for moving the drawbar axially within the rotating spindle. The mechanism comprises a normally inactive harmonic drive means carried on the spindle, and a cam connection between the output of the harmonic drive means and the drawbar, whereby actuation of the harmonic drive means causes the cam connection to move the drawbar axially. The harmonic drive means is actuated by a brake means that is arranged to engage a reaction member in the harmonic drive means. The brake means can be operated by a remotely-generated electric signal or hydraulic signal.

A principal advantage of the invention is that the drawbar moving mechanism is relatively compact, especially in the axial direction. The moving mechanism can be arranged in surrounding relation to the drawbar such that it does not increase the axial length of the machine tool. Means are provided for the tool to be self-actuated by using some of the drive power generated from the machine to rotate the tool.

There are in existence various prior art devices associated with rotary spindles for moving a cutter between a extended operating position and a retracted position. U.S. Pat. No. 3,391,585 to Griswold et al shows a double acting hydraulic cylinder for this purpose. U.S. Pat. No. 3,740,161 to V. Milewski also shows a double-acting hydraulic cylinder for retracting a cutter element. U.S. Pat. No. 4,742,738 to K. Strand shows a planetary gearing mechanism for retracting a cutter element carried on a rotary spindle. The use of a harmonic drive means for retracting a rotary cutter element is believed to be new in the art.

BRIEF DESCRIPTION OF THE DRAWINGS

FIG. 1 is a fragmentary sectional view taken through a machine tool embodying the invention.

FIG. 2 is a transverse sectional view taken on line 2-2 in FIG. 1.

FIG. 3 is a transverse sectional view taken on line 3-3 in FIG. 1.

DETAILED DESCRIPTION OF THE PREFERRED EMBODIMENTS

The drawings show a machine tool that comprises a powered rotary spindle 10 that carries a retractable cutter element 12. The cutter element is attached to a slide structure 14 that can move transverse to the spindle axis 15, whereby the cutter element can be moved into or outward (away) from the spindle. An axially movable drawbar 17 is located within the spindle for moving the cutter element. The drawbar is connected to slide structure 14, such that rightward motion of the drawbar (FIG. 1) retracts the cutter element; leftward motion of the drawbar extends the cutter element to its operating position. The end of the drawbar is bifurcated; inclined spines in the bifurcated end act as cams to move the slide structure. FIG. 1 shows the drawbar in a position where the cutting element is extended from the spindle. The drawbar can slide axially relative to spindle 10, but it cannot rotate relative to the spindle. A key 19 extends from the drawbar into an axial slot 21 in the spindle to prevent relative rotation between the drawbar and the spindle.

In the illustrated tool the spindle is comprised of two axially aligned members 23 and 25. Bolts 27 can be used to connect the two members together. The two-piece spindle is rotatably supported in a stationary annular housing 29 that carries anti-friction bearings 30 and 31. The housing also carries a releaseable brake mean 33 that controls the operation of a harmonic drive means carried on the spindle.

The harmonic drive means comprises an annular reaction member 35 that has an inner toothed surface 37 and an outer brake-engagement surface 39. The input drive to the harmonic drive means consists of two rollers 41 that extend axially from shoulder 43 of the spindle into the space circumscribed by an annular deformable band (ring) 45. Band 45 constitutes the output means for the harmonic drive unit. Those skilled in the art will recognize that the harmonic drive may be modified by the addition of a bearing between deformable band 45 and the annular reaction member 35 for faster drive and decrease in friction. In addition, other reduction gear arrangements may also be substituted for the harmonic drive assembly without departing from the scope or spirit of this invention.

During normal operation of the tool the harmonic drive means is in an inactive state. The operating components of the harmonic drive means (members 35, 41 and 45) rotate as a unit with the spindle. An annular cam element 47 is supported on the spindle and loosely linked to deformable band 45. The illustrated linkage comprises a series of axial slots 49 in band 45 and mating ribs (spokes) 51 extending radially outwardly from cam element 47 into the slots. The linkage is such that cam element 47 is at all times rotatable with band 45; however the band can deform radially relative to the cam element.

The left end face 53 of annular element 47 is angled acutely to a radial plane so as to form an axially-extending cam surface. Operatively engaged with cam surface 53 is a flat radial plate 55 that is suitably affixed to drawbar 17. Coil spring 57 acts on drawbar 17 to keep plate 55 operatively engaged with cam element 47. Plate 55 acts as a cam follower.

The aforementioned brake means 33 comprises a solenoid 59 having a plunger 61 extending toward outer surface 39 of reaction member 35. During normal operation of the tool plunger 61 is spaced from reaction member 35, as shown in FIG. 1 and 3. When it is intended to move cutter 12 away from and to the spindle, solenoid 59 is remotely operated so that plunger 61 moves into operative engagement with reaction member 35, thereby holding that member in a stationary (braked) condition. The end of plunger 61 has a chisel shape to facilitate entry into surface 29.

With member 35 in a stationary condition band 45 will have a relatively slow rotary motion on member 35. Rollers 41 will rotate (orbit) at a speed proportionate to the speed of spindle 10, thereby deforming band 45 into toothed engagement with stationary member 35. The tooth complement on band 45 is less than the tooth complement on reaction member 35, so that band 45 is caused to slowly rotate in a direction opposite to spindle 10; the motions are relative, not absolute.

Cam element 47 rotates with band 45, so as to produce a rightward axial motion of drawbar 17 (due to the interengagement between cam surface 53 and plate 55). The drawbar follows the cam to move the cutter element 12 away from and into the spindle, thus defining one complete cycle of the rotary cutter operation.

After a predetermined rightward motion of the drawbar a shoulder 63 on drawbar 17 is located slightly to the right of an actuator element of switch 65. The switch is thereby actuated from one condition to another condition. Switch 65 is electrically located in the control circuit for solenoid 59, such that when the switch is tripped the solenoid is activated to withdraw plunger 61 away from reaction member 35. The reaction member thus resumes its normal rotational status (rotating with the spindle). The effect of this action is to return cam element 47 to retracted condition, with the drawbar moved to its normal unactuated or neutral position.

The illustrated harmonic drive means is advantageous in that it utilizes the spindle motion as its power source; no external power is required. The harmonic drive means has the further advantage that it is relatively compact; the harmonic drive means can be installed within the spindle without appreciably increasing the spindle diameter or spindle length.

The drawings show the brake means in the form of a plunger operated by an electrical solenoid. Alternatively, the plunger could be operated hydraulically, i.e. the plunger could be part of a hydraulic piston connectable to a remote hydraulic pressure source. Various other changes could be made while still practicing the invention.

I claim:

1. A machine tool comprising a rotary spindle; radially movable cutter means carried on said spindle; an axially slidable drawbar located within said spindle; means interconnecting the drawbar and cutter means whereby axial movement of the drawbar within the spindle causes the cutter means to be radially moved into or out from the spindle; a normally inactive harmonic drive means carried on said spindle, said harmonic drive means comprising an annular input means, an annular reaction member, and an annular output means; a releaseable brake means movable toward or away from said reaction member; and a cam connection between said output means and said drawbar whereby said output means drives the drawbar axially for retraction of the cutter means.

2. The machine tool of claim 1, wherein said annular reaction member has an internal toothed surface and an external brake-engagement surface.

3. The machine tool of claim 2, wherein said releasable brake means comprises a solenoid having a plunger movable toward or away from said brake-engagement surface.

4. The machine tool of claim 1, wherein said annular reaction member at least partly encircles the input means and the output means.

5. The machine tool of claim 1, wherein said cam connection comprises a plate extending radially from the drawbar and an annular cam member having a cam surface in axial registry with said plate, whereby rotary motion of the cam member causes the plate and associated drawbar to move axially.

6. The machine tool of claim 1, and further comprising a fixed annular housing encircling said spindle, and axially-spaced anti-friction bearings carried by said housing for rotatably supporting the spindle.

7. The machine tool of claim 6, wherein said releaseable brake means comprises a radially-movable plunger mechanism carried on said housing in the space between the anti-friction bearings.

8. The machine tool of claim 6, wherein said releaseable brake means comprises a solenoid carried on said housing; said solenoid having a plunger movable radially toward or away from said annular reaction member.

* * * * *